United States Patent
Wei et al.

(10) Patent No.: US 12,489,664 B2
(45) Date of Patent: Dec. 2, 2025

(54) ENCODING METHOD, DECODING METHOD, ENCODING APPARATUS, AND DECODING APPARATUS

(71) Applicant: HUAWEI TECHNOLOGIES CO., LTD., Guangdong (CN)

(72) Inventors: Fan Wei, Shenzhen (CN); Lei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 18/460,604

(22) Filed: Sep. 4, 2023

(65) Prior Publication Data
US 2023/0412439 A1 Dec. 21, 2023

Related U.S. Application Data

(63) Continuation of application No. PCT/CN2022/078299, filed on Feb. 28, 2022.

(30) Foreign Application Priority Data

Mar. 9, 2021 (CN) .......................... 202110256625.4

(51) Int. Cl.
*H04L 27/26* (2006.01)
*H04L 1/00* (2006.01)

(52) U.S. Cl.
CPC ...... *H04L 27/26134* (2021.01); *H04L 1/0056* (2013.01); *H04L 27/26035* (2021.01)

(58) Field of Classification Search
CPC ............ H04L 27/26134; H04L 1/0056; H04L 27/26035; H04L 1/0041; H04L 1/0045; H04L 1/0057; H04L 5/0021; H04L 27/30; H04L 27/2634; H04J 13/0074; H04J 13/0077; H03M 7/3062; H04W 4/70
See application file for complete search history.

(56) References Cited

U.S. PATENT DOCUMENTS

| | | | |
|---|---|---|---|
| 2013/0272444 A1* | 10/2013 | Barron | H04L 1/00 375/295 |
| 2019/0020520 A1* | 1/2019 | Bakulin | H04L 27/2636 |
| 2020/0127779 A1 | 4/2020 | Ji et al. | |

FOREIGN PATENT DOCUMENTS

| WO | 2011140556 A1 | 11/2011 |
|---|---|---|
| WO | 2020030257 A1 | 2/2020 |

* cited by examiner

*Primary Examiner* — Jean B Corrielus (57) ABSTRACT

A terminal device obtains coding information that includes a first information bit and a second information bit. The terminal device selects, based on the first information bit, K groups from a codebook having L groups as activation groups, where both L and K are positive integers, and K is less than L. The terminal device then selects, based on the second information bit, a sequence from each of the activation groups as an activation sequence, and obtains a first sequence by superimposing the K activation sequences.

20 Claims, 6 Drawing Sheets

Obtain an information bit, where the information bit includes a first information bit and a second information bit — S310

Select, based on the first information bit, K groups from a codebook having L groups as activation groups, where both L and K are positive integers, and K is less than L — S320

Select, based on the second information bit, a sequence from each of the activation groups as an activation sequence — S330

Obtain a first sequence, where the first sequence is obtained by superimposing the K activation sequences — S340

ENCODING METHOD, DECODING METHOD, ENCODING APPARATUS, AND DECODING APPARATUS

CROSS-REFERENCE TO RELATED APPLICATIONS

This application is a continuation of International Application PCT/CN2022/078299, filed on Feb. 28, 2022, which claims priority to Chinese Patent Application. 202110256625.4, filed on Mar. 9, 2021. The disclosures of the aforementioned priority applications are hereby incorporated by reference in their entirety.

TECHNICAL FIELD

This application relates to the communication field, and in particular, to an encoding method, a decoding method, an encoding apparatus, and a decoding apparatus.

BACKGROUND

As one of three 5G communication scenarios, massive machine type communication (mMTC) is mainly oriented to a requirement of large-scale machine communication in the future. A 5G massive connection scenario is characterized by a large number of potential access users. For example, in a single cell, an access quantity of potential terminals is usually 500 to 2000. Second, services of terminal devices are mainly short packets, and a typical packet length is usually 10 to 20 bytes. Finally, in some industrial scenarios, there are specific requirements for a latency of data transmission. Therefore, to meet the foregoing transmission requirements, how to design a coding and modulation scheme for an mMTC short packet transmission service is a problem to be urgently resolved.

SUMMARY

This application provides an encoding method, a decoding method, an encoding apparatus, and a decoding apparatus, to implement encoding and modulation for an mMTC short packet transmission service, so as to improve decoding performance of a receive end.

According to a first aspect, an encoding method is provided, and the method includes: obtaining an information bit, where the information bit includes a first information bit and a second information bit; selecting, based on the first information bit, K groups from a codebook having L groups as activation groups, where both L and K are positive integers, and K is less than L; selecting, based on the second information bit, a sequence from each of the activation groups as an activation sequence; and obtaining a first sequence, where the first sequence is obtained by superimposing the K activation sequences.

In the technical solutions of this embodiment of this application, the K groups are selected from the L potential groups as the activation groups, and the activation sequences are selected from the K groups. When the quantity L of groups is relatively large, a quantity of superposition activation sequences in a sparse superposition code is reduced. Therefore, interference generated by excessive superposition sequences is reduced during decoding at the receive end, thereby reducing a code error rate during decoding at the receive end.

With reference to the first aspect, in some implementations of the first aspect, the method includes: obtaining the K activation groups based on the first information bit according to a first mapping rule, where the first mapping rule is for determining locations of the K activation groups; and obtaining the K activation sequences based on the second information bit according to a second mapping rule, where the second mapping rule is for determining a location of an activation sequence of each of the K activation groups.

With reference to the first aspect, in some implementations of the first aspect, the method includes: obtaining an encoding parameter, where the encoding parameter includes at least one of the following: a quantity L of codebook groups, a quantity K of activation groups, a quantity B of sequences in each group, a sequence length M, or a codebook type.

With reference to the first aspect, in some implementations of the first aspect, the method further includes: sending a received signal, where the received signal is obtained based on the first sequence and an additive white Gaussian noise, the first sequence is represented by using the codebook and a first sparse vector, and the first sparse vector is obtained based on the first information bit and the second information bit.

With reference to the first aspect, in some implementations of the first aspect, the method includes that the first sequence is represented by using the codebook and a first sparse vector includes that the first sequence is represented by using a product of the codebook and the first sparse vector.

In a possible embodiment, the method further includes: using, by a plurality of transmit ends, a same codebook for encoding.

In the technical solutions of this embodiment of this application, in a multi-user scenario, because a plurality of users use a shared codebook, a quantity of codebooks does not increase with a quantity of users, complexity of a received signal sent by a transmit end to a receive end is reduced, and complexity of decoding at the receive end can be reduced.

According to a second aspect, a decoding method is provided, and the method includes: obtaining a received signal, where the received signal includes a first sequence and an additive white Gaussian noise; determining a second sparse vector based on an activation threshold, to obtain a third sparse vector, where the second sparse vector is obtained by decoding the received signal based on a compressive sensing algorithm; and obtaining an information bit based on the third sparse vector, where the information bit includes a first information bit and a second information bit.

In the technical solutions of this embodiment of this application, the K groups are selected from the L potential groups as the activation groups, and the activation sequences are selected from the K groups. When the quantity L of groups is relatively large, a quantity of superposition activation sequences in a sparse superposition code is reduced. Therefore, interference generated by excessive superposition sequences is reduced during decoding at the receive end, thereby reducing a code error rate during decoding at the receive end.

With reference to the second aspect, in some implementations of the second aspect, the method includes: if a maximum value in each group in the second sparse vector is greater than the activation threshold, a value of an element that is in the third sparse vector and that corresponds to the maximum value is 1; or if a maximum value of an element in each group in the second sparse vector is less than or equal to the activation threshold, a value of an element that is in the third sparse vector and that corresponds to the maximum value of the element is 0; and a value of an element that is in the third sparse vector and that corresponds to another element in each group in the second sparse vector is 0.

With reference to the second aspect, in some implementations of the second aspect, the obtaining an information bit based on the third sparse vector includes: decoding the third sparse vector according to a first mapping rule and a second mapping rule, to obtain the information bit, where the first information bit is for determining K activation groups selected from a codebook having L groups, and the second information bit is for determining an activation sequence in each of the activation groups, where both L and K are positive integers, and K is less than L.

With reference to the second aspect, in some implementations of the second aspect, the method includes that the first mapping rule is for determining the first information bit corresponding to locations of the K activation groups, and the second mapping rule is for determining the second information bit corresponding to a location of an activation sequence of each of the K activation groups.

With reference to the second aspect, in some implementations of the second aspect, the method further includes: obtaining a decoding parameter, where the decoding parameter further includes at least one of the following parameters: a quantity L of codebook groups, a quantity B of sequences in each group, a sequence length M, or a codebook type.

In the technical solutions of this embodiment of this application, because at the receive end, the K activation vectors are less than the L activation vectors, interference becomes smaller when an activation sequence in a network device is determined. Therefore, even if the quantity L of groups in the codebook increases, the technical solutions in this embodiment of this application can reduce a code error rate of the network device.

According to a third aspect, an encoding apparatus is provided, where the apparatus includes a transceiver unit and a processing unit, where the transceiver unit is configured to obtain an information bit, where the information bit includes a first information bit and a second information bit; the processing unit is configured to select, based on the first information bit, K groups from a codebook having L groups as activation groups, where both L and K are positive integers and K is less than L; the processing unit is configured to select, based on the second information bit, a sequence from each of the activation groups as an activation sequence; and the processing unit is configured to obtain a first sequence, where the first sequence is obtained by superimposing the K activation sequences.

In the technical solutions of this embodiment of this application, the K groups are selected from the L potential groups as the activation groups, and the activation sequences are selected from the K groups. When the quantity L of groups is relatively large, a quantity of superposition activation sequences in a sparse superposition code is reduced. Therefore, interference generated by excessive superposition sequences is reduced during decoding at the receive end, thereby reducing a code error rate during decoding at the receive end.

With reference to the third aspect, in some implementations of the third aspect, the processing unit is configured to obtain the K activation groups based on the first information bit according to a first mapping rule, where the first mapping rule is for determining locations of the K activation groups; and obtain the K activation sequences based on the second information bit according to a second mapping rule, where the second mapping rule is for determining a location of an activation sequence of each of the K activation groups.

With reference to the third aspect, in some implementations of the third aspect, the transceiver unit is configured to obtain an encoding parameter, where the encoding parameter includes at least one of the following: a quantity L of codebook groups, a quantity K of activation groups, a quantity B of sequences in each group, a sequence length M, or a codebook type.

With reference to the third aspect, in some implementations of the third aspect, the transceiver unit is configured to send a received signal, where the received signal is obtained based on the first sequence and an additive white Gaussian noise, the first sequence is represented by using the codebook and a first sparse vector, and the first sparse vector is obtained based on the first information bit and the second information bit.

With reference to the third aspect, in some implementations of the third aspect, the apparatus includes that the first sequence is represented by using the codebook and a first sparse vector includes that the first sequence is represented by using a product of the codebook and the first sparse vector.

In a possible embodiment, the apparatus further includes: using, by a plurality of transmit ends, a same codebook for encoding.

In the technical solutions of this embodiment of this application, in a multi-user scenario, because a plurality of users use a shared codebook, a quantity of codebooks does not increase with a quantity of users, complexity of a received signal sent by a transmit end to a receive end is reduced, and complexity of decoding at the receive end can be reduced.

According to a fourth aspect, a decoding apparatus is provided, where the apparatus includes a transceiver unit and a processing unit, where the transceiver unit is configured to obtain a received signal, where the received signal includes a first sequence and an additive white Gaussian noise; the processing unit is configured to determine a second sparse vector based on an activation threshold, to obtain a third sparse vector, where the second sparse vector is obtained by decoding the received signal based on a compressive sensing algorithm; and the processing unit is configured to obtain an information bit based on the third sparse vector, where the information bit includes a first information bit and a second information bit.

In the technical solutions of this embodiment of this application, the K groups are selected from the L potential groups as the activation groups, and the activation sequences are selected from the K groups. When the quantity L of groups is relatively large, a quantity of superposition activation sequences in a sparse superposition code is reduced. Therefore, interference generated by excessive superposition sequences is reduced during decoding at the receive end, thereby reducing a code error rate during decoding at the receive end.

With reference to the fourth aspect, in some implementations of the fourth aspect, the method includes: if a maximum value in each group in the second sparse vector is greater than the activation threshold, a value of an element that is in the third sparse vector and that corresponds to the maximum value is 1; or if a maximum value of an element in each group in the second sparse vector is less than or equal to the activation threshold, a value of an element that is in the third sparse vector and that corresponds to the maximum value of the element is 0; and a value of an element that is in the third sparse vector and that corresponds to another element in each group in the second sparse vector is 0.

With reference to the fourth aspect, in some implementations of the fourth aspect, the obtaining an information bit based on the third sparse vector includes: decoding the third sparse vector according to a first mapping rule and a second mapping rule, to obtain the information bit, where the first information bit is for determining K activation groups selected from a codebook having L groups, and the second information bit is for determining an activation sequence in each of the activation groups, where both L and K are positive integers, and K is less than L.

With reference to the fourth aspect, in some implementations of the fourth aspect, the method includes that the first mapping rule is for determining the first information bit corresponding to locations of the K activation groups, and the second mapping rule is for determining the second information bit corresponding to a location of an activation sequence of each of the K activation groups.

With reference to the fourth aspect, in some implementations of the fourth aspect, the transceiver unit is further configured to obtain a decoding parameter, where the decoding parameter further includes at least one of the following parameters: a quantity L of codebook groups, a quantity B of sequences in each group, a sequence length M, or a codebook type.

In the technical solutions of this embodiment of this application, because at the receive end, the K activation vectors are less than the L activation vectors, interference becomes smaller when an activation sequence in a network device is determined. Therefore, even if the quantity L of groups in the codebook increases, the technical solutions in this embodiment of this application can reduce a code error rate of the network device.

According to a fifth aspect, a decoding apparatus is provided, including a processor and a memory, where the memory is configured to store a computer program, and the processor is configured to invoke and run the computer program stored in the memory, to execute instructions of the method in any one of the first aspect or the possible implementations of the first aspect.

According to a sixth aspect, a decoding apparatus is provided, including a processor and a memory, where the memory is configured to store a computer program, and the processor is configured to invoke and run the computer program stored in the memory, to execute instructions of the method in any one of the second aspect or the possible implementations of the second aspect.

According to a seventh aspect, a computer-readable medium is provided, configured to store a computer program, where the computer program includes instructions used to perform the method in the first aspect or any possible implementation of the first aspect, or instructions used to perform the method in the second aspect or any possible implementation of the second aspect.

According to an eighth aspect, a chip is provided, and may include a processor and a data interface. The processor invokes and runs a computer program from a memory through the data interface, so that a device on which the chip is installed performs instructions of the method in any one of the first aspect or the possible implementation of the first aspect, or instructions used to enable the device on which the chip is installed to perform the method in any one of the second aspect or the possible implementation of the second aspect.

DESCRIPTION OF EMBODIMENTS

The following describes technical solutions of this application with reference to the accompanying drawings.

The technical solutions in embodiments of this application may be applied to various communication systems, for example: a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a future 5th generation (5G) system, or a new radio (NR) system.

The terminal device in embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like, which is not limited in embodiments of this application.

A network device in embodiments of this application may be a device configured to communicate with a terminal device. The network device may be a base transceiver station (BTS) in a global system for mobile communication (GSM) system or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in embodiments of this application.

Figure 1:
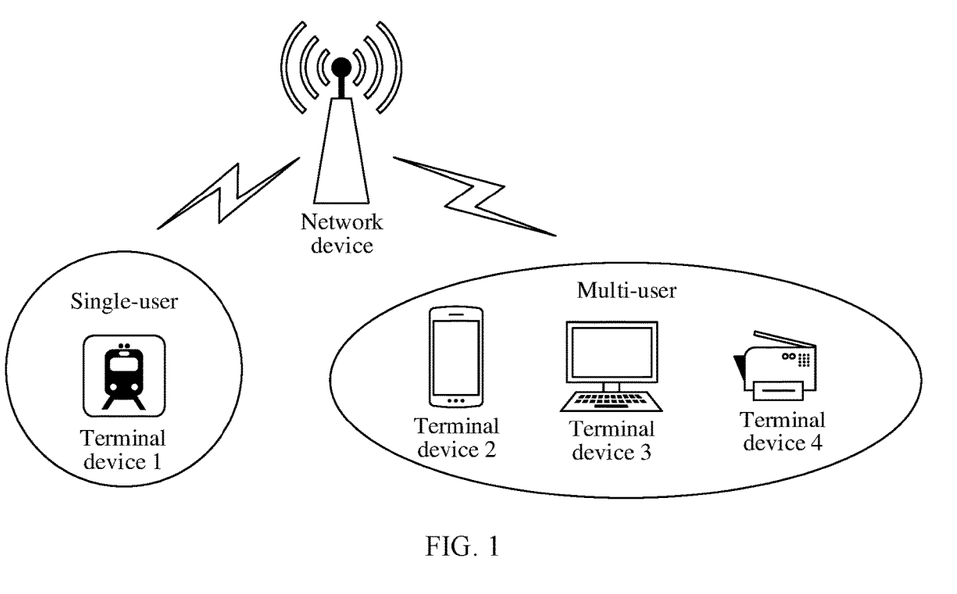
FIG. 1 is a schematic diagram of a communication system according to an embodiment of this application.

FIG. 1 is a schematic diagram of a communication system according to an embodiment of this application. The encoding method in embodiments of this application is applicable to a network device and a single user, and is also applicable to a network device and a plurality of users.

It should be understood that FIG. 1 is merely a simplified schematic diagram of an example for ease of understanding. The communication system may further include another network device or another terminal device that is not shown in FIG. 1.

It should be understood that an encoding side may be a terminal device, and a decoding side may be a network device, or the encoding side may be a network device, and the decoding side may be a terminal device. This is not limited in this embodiment of this application. In this embodiment of this application, an example in which an encoding side is a terminal device and a decoding side is a network device is used.

Figure 2:
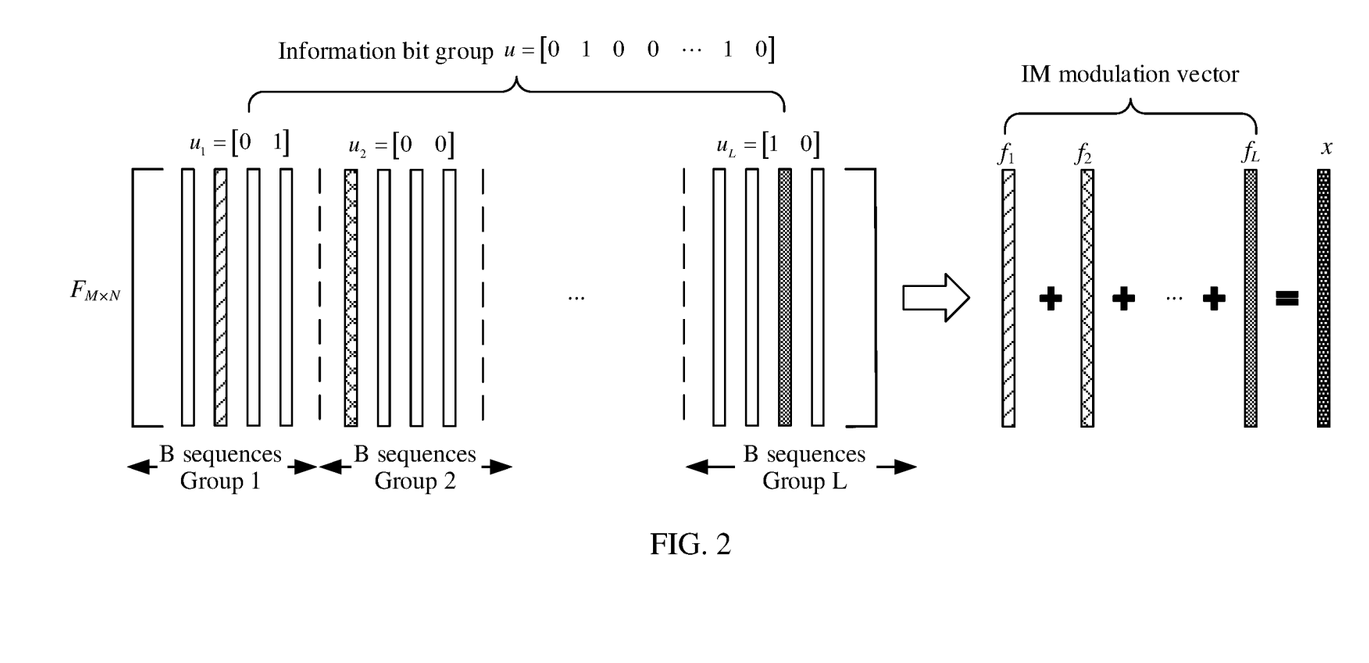
FIG. 2 is a schematic diagram of a coding principle of a sparse superposition code according to an embodiment of this application.

Currently, there is a coding and modulation method for a short packet transmission service in mMTC. This coding and modulation solution is a sparse superposition code. A coding principle of the sparse superposition code is shown in FIG. 2. FIG. 2 is a schematic diagram of a coding principle of a sparse superposition code according to an embodiment of this application. The following describes a principle of a sparse superposition code in detail with reference to FIG. 2.

An encoding principle of a sparse superposition code is that a codebook is divided into L groups. Each group includes B column vectors, and the B column vectors may also be referred to as B sequences. The terminal device selects one column vector from each group of B sequences based on index modulation (IM) and based on an information bit u, and a total of L column vectors are selected. A codeword sent by the terminal device is obtained through superimposing the L column vectors.

For example, $F_{M \times N}$ is a perception matrix of the encoding side, that is, a codebook, and the perception matrix includes N column vectors whose length is M. A quantity of information bits in each group is $N=\log_2 B$. Each group has B column vectors. In FIG. 2, each group has four column vectors. In this case, B=4, and therefore, the quantity of information bits in each group is 2. The information bit in FIG. 2 is u=[0 1 0 0 ... 1 0], which indicates that the terminal device needs to select a second column vector in a group 1, a first column vector in a group 2, and a third column vector in a group L. Information bits in other groups are not shown in the figure. A selection principle of the group column vector is consistent with the group shown in the figure.

The terminal device selects, based on the information bit and based on the IM modulation scheme, a sequence from the four column vectors in each group as $f_l$, where $l \in [1, L]$ is a positive integer, and superimposes these sequences to obtain a sent codeword of the terminal device.

The terminal device obtains a received signal of the network device by performing an additive white Gaussian noise on a basis of sending the codeword, as shown in Formula (1).

$$y_M = F_{M \times N} s_N + n_M \quad (1)$$

$y_M$ a received signal, $F_{M \times N}$ represents a perception matrix, $n_M$ represents an additive white Gaussian noise on the M time-frequency resources, and $s_N$ represents an N-dimensional 0-1 sparse vector, where a non-zero element 1 indicates a selected sequence in the perception matrix. For example, a sparse vector $s_N$ corresponding to FIG. 2 is $s_N = [0100\ 1000\ \ldots\ 0010]^T$.

Because the sparse vector has sparseness, the network device decodes the received signal by using a compressive sensing algorithm, for example, an approximate message passing (AMP) algorithm, to restore the sparse vector, and then decodes the information bit based on a bit mapping relationship.

When the network device decodes the received signal based on the AMP algorithm to obtain the sparse vector, in the AMP algorithm, a maximum value in each group of the restored vector $\hat{s}_N$ is determined as an activation sequence, to obtain a sparse vector obtained after decoding. When a quantity of information that needs to be transmitted increases, a corresponding quantity of bits needs to be increased, which may be implemented by increasing a quantity L of groups or increasing a quantity B of column vectors in each group. When the quantity L of groups increases, determining an activation sequence in an $l^{th}$ group is interfered by a superimposition sequence of another group, so that a code error rate during decoding by the network device increases. In addition, when power of a codeword generated by sequence superposition is fixed, the code rate is $$R = \frac{L \log_2 B}{M},$$

and a larger quantity of groups indicates a smaller power of a single superposition sequence, thereby reducing a probability of correct sequence detection.

Therefore, how to reduce a code error rate of a network device when the quantity L of groups increases is an urgent problem to be resolved.

Figure 3:
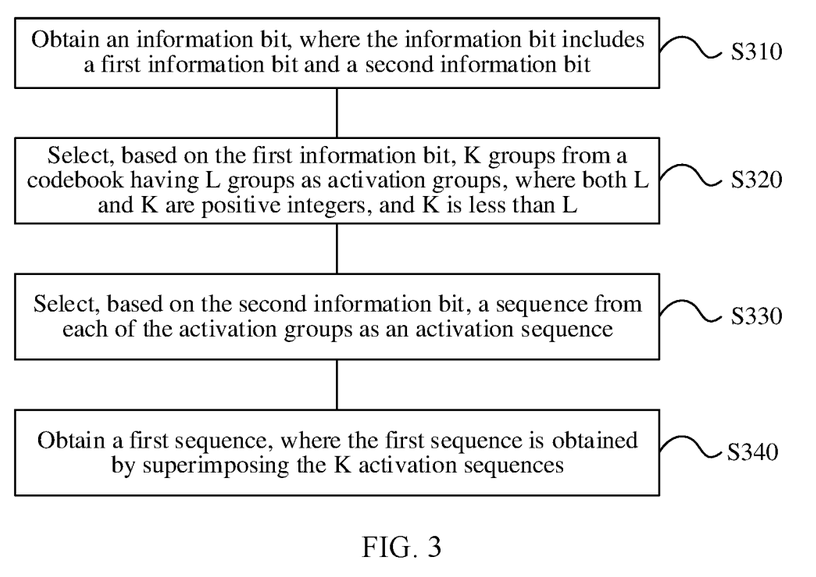
FIG. 3 is a schematic flowchart of an encoding method according to an embodiment of this application.

Embodiments of this application provide an encoding method and apparatus. Specifically, as shown in FIG. 3, FIG. 3 is a schematic flowchart of an encoding method according to an embodiment of this application.

S310. A terminal device obtains an information bit, where the information bit includes a first information bit and a second information bit.

In a possible implementation, the first information bit is for selecting K groups from a codebook as activation groups, the second information bit is for selecting an activation sequence from each activation group, and K is a positive integer.

S320. The terminal device selects, based on the first information bit, K groups from a codebook having L groups as activation groups, where both L and K are positive integers, and K is less than L.

It should be understood that the codebook of the L groups represents that L potential groups in the codebook can be selected, that is, a total quantity of groups in the codebook is L, and each group includes a same quantity of sequences, for example, each group includes B sequences. Both L and B are positive integers.

It should be understood that the activation group represents K groups selected from the L potential groups of the codebook, and the K groups are activation groups. Only a sequence in the activation group is selected. In other words, a sequence in another group that is not selected except the activation group is not selected.

S330. Select, based on the second information bit, an activation sequence from each of the activation groups.

S340. The terminal device obtains a first sequence, where the first sequence is obtained by superimposing the K activation sequences.

The terminal device selects K groups from the L potential groups as the activation groups, and the activation sequences are selected from the K groups. When the quantity L of groups is relatively large, a quantity of superposition activation sequences in a sparse superposition code is reduced. Therefore, interference generated by excessive superposition sequences is reduced during decoding at the network device, thereby reducing a code error rate during decoding at the network device.

Figure 4:
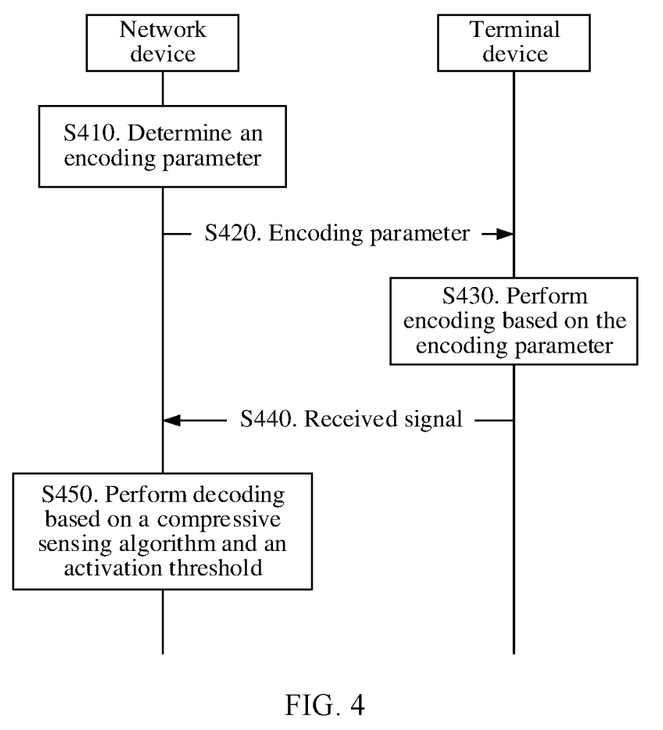
FIG. 4 is a schematic flowchart of another encoding method according to an embodiment of this application.

The following describes in detail an encoding method in an embodiment of this application with reference to FIG. 4. FIG. 4 is a schematic flowchart of another encoding method according to an embodiment of this application.

S410. A network device determines an encoding parameter.

In a possible implementation, the encoding parameter includes at least one of the following parameters: a quantity K of activation group, a quantity L of codebook groups, a quantity B of sequences in each group, a sequence length M, and a codebook type, where K, L, and B are all positive integers, and K is less than L.

S420. The network device sends the determined encoding parameter to a terminal device, and the terminal device receives the encoding parameter.

In a possible implementation, the quantity L of codebook groups and the quantity K of activation groups in the encoding parameter may be configured and sent to the terminal device by using radio resource control (RRC) signaling. Alternatively, there is a preset correspondence between the quantity L of codebook groups and the quantity K of activation groups, and the terminal device does not need to obtain the encoding parameter through signaling configuration. This is not limited in this embodiment of this application.

The quantity B of sequences in each group may also be configured and sent to the terminal device by using RRC signaling.

The sequence length M may be calculated based on a time-frequency resource occupied by a sent codeword. Alternatively, in another application scenario, for example, ultra reliable low latency communication (uRLLC), a size of a time-frequency resource occupied by a codeword is preset. In this case, the sequence length M may use a preset value. In this embodiment of this application, this is not limited.

The codebook type may be referred to as a perception matrix type, and this parameter indicates a codebook type used by the terminal device. The perception matrix type may be a discrete Fourier transform (DFT) DFT matrix, a Hadamard code matrix, a random Gaussian matrix, or another matrix type. This is not limited in this embodiment of this application. The codebook type may be configured and sent to the terminal device by using RRC signaling, or a mapping relationship between a codebook type and a sequence length M may be specified by using a protocol, or a mapping relationship between a codebook type and a quantity L of codebook groups, or a mapping relationship between a codebook type and another encoding parameter may be specified by using a protocol. This is not limited in this embodiment of this application.

In a possible implementation, a manner in which the network device determines the perception matrix may be: first determining an N×N orthogonal matrix, where the orthogonal matrix may be any one of the foregoing matrix types, and then randomly selecting M rows from the N×N orthogonal matrix to form the perception matrix. Both M and N are positive integers, M is less than N, and N is a product of a quantity L of codebook groups and a quantity B of sequences in each group, that is, N=LB.

In a possible implementation, the terminal device may further obtain a unique perception matrix type by using a protocol, and the network device does not need to configure the parameter for the terminal device.

It should be understood that the encoding parameters determined by the network device are the same for all terminals in a range of the network device, and all terminal devices may share a same codebook.

S430. The terminal device performs encoding based on the encoding parameter.

In a possible implementation, the terminal device obtains an information bit based on the encoding parameter, where the information bit includes a first information bit $u_I$ and a second information bit $u_{II}$; and obtains a first sequence based on bit information, where the first sequence is obtained by superimposing the K activation sequences.

The terminal device selects K groups from the L potential groups in the codebook as the activation groups. There are total $C_L^K$ manners of selecting the activation groups. Therefore, a quantity of bits in the first information bit $u_I$ is $N_1 = \lfloor \log_2 C_L^K \rfloor$. The first information bit $u_I$ indicates the K activation groups selected from the L potential groups in the codebook. In other words, the information included in the first information bit $u_I$ may clearly know the specific K activation groups selected by the terminal device from the $C_L^K$ activation group selection manners, and $\lfloor \ \rfloor$ indicates rounding down.

In a possible implementation, the terminal device determines the K activation groups according to the first information bit and the first mapping rule, where the first mapping rule may indicate a mapping relationship between the first information bit and the K activation groups selected from the codebook, and the first mapping rule is for determining locations of the K activation groups. In other words, locations of the K activation groups in the codebook are determined. In other words, the first mapping rule is used by the terminal device to determine, based on the first information bit, locations of the K activation groups selected from the codebook.

The first mapping rule may use a natural mapping manner, that is, $C_L^K$ methods for selecting an activation group are numbered to form a mapping table, a binary-to-decimal conversion is performed on the first information bit to obtain a corresponding number, and corresponding K activation groups are known through table lookup based on the decimal number. That is, locations of the K activation groups in the L potential groups are known.

Alternatively, the first mapping rule may be obtained through calculation by using a greedy algorithm. First, binary-to-decimal conversion is performed on the first information bit to obtain a decimal number i of the first information bit, and then locations of the K activation groups corresponding to the decimal number i are calculated according to the following steps.

S1. Make j=K, search for a largest number $n_j \geq j$, so that $C_{n_j}^j \leq i$;

S2. Update $i = i - C_{n_j}^j$, j=j−1; and

S3. Repeat steps S1-S2 until all K locations $\{n_1, n_2, \ldots n_K\}$ are found, where $n_j \in [1, L]$.

In a possible implementation, the terminal device determines the K activation sequences based on the second information bit and according to the second mapping rule. The second mapping rule may indicate a mapping relationship between the second information bit and the activation sequence selected from each activation group. The second mapping rule is for determining a location of the activation sequence, that is, determine a location of the activation sequence selected from each of the K activation groups. In other words, the second mapping rule is used by the terminal device to determine the locations of the K activation sequences based on the second information bit.

In a possible implementation, the terminal device may determine, based on the quantity B of sequences in each group in the encoding parameter, that a quantity of second information bits is $N_2 = \lfloor K \log_2 B \rfloor$, where $\log_2 B$ is a quantity of bits in each activation group, and $\lfloor \ \rfloor$ represents rounding down. The second information bit indicates an activation sequence in each activation group.

The terminal device determines the K activation sequences based on the second information bit $u_{II}$ and according to the second mapping rule, where the second mapping rule is for determining a location of the activation sequence of each of the K activation groups.

In the second mapping rule, natural mapping may be used to convert the second information bit $u_{II}$ corresponding to the activation sequence into a decimal number, so as to determine a location of the activation sequence of each of the K activation groups. The bit rate of the improved encoding method is $$R = \frac{\log_2 C_L^K + K \log_2 B}{M}.$$

An increase in the quantity L of groups in the codebook can reduce a loss of a code rate. However, in the technical solutions of this application, an actual amount of interference during decoding can be reduced while the quantity L of codebook groups is increased without a loss of a code rate, thereby reducing a code error rate during decoding by the network device. For example, Scenario one: A quantity L of codebook groups is 96, a quantity K of activation groups is 10, and a quantity B of sequences in each group is 256. Scenario 2: The quantity L of codebook groups is 15, the quantity K of activation groups is 15, and the quantity B of sequences in each group is 256. A code rate in scenario 1 is similar to a code rate in scenario 2. However, a solution in scenario 1 can effectively reduce an actual amount of interference during decoding. In this way, a code error rate during decoding by the network device is reduced.

Figure 5:
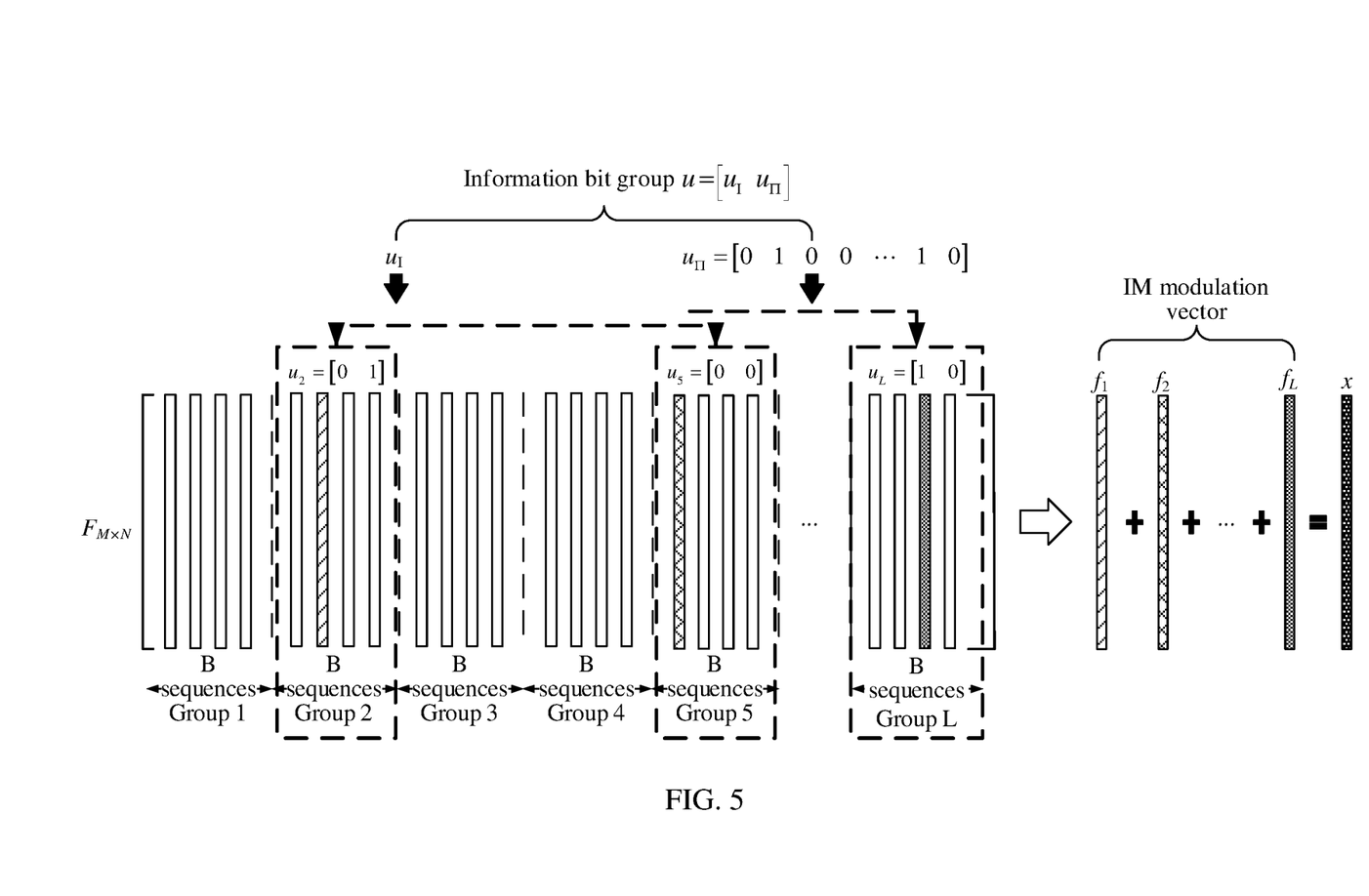
FIG. 5 is a schematic diagram of a principle of an encoding method according to an embodiment of this application.

The following describes an improved sparse superposition code coding principle in detail with reference to FIG. 5. FIG. 5 is a schematic diagram of a principle of an encoding method according to an embodiment of this application.

As shown in FIG. 5, a second group, a fifth group, and an $L^{th}$ group are determined as the activation groups based on the first information bit and according to the first mapping rule. Based on the second information bit $u_n = [0\ 1\ 0\ 0\ \ldots\ 1\ 0]$ and according to the second mapping rule, it is determined that a second sequence in the second group, a first sequence in the fifth group, and a third sequence in the $L^{th}$ group are activated.

The terminal device obtains the first sequence, where the first sequence is obtained by superimposing the K activation sequences, and a codeword finally generated by the terminal device is the first sequence obtained by superimposing the K activation sequences.

In a possible implementation, a first sparse vector is obtained based on the first information bit and the second information bit, where the first sparse vector indicates a location of an activation sequence in a codebook, and the first sequence may be obtained through multiplying the codebook and the first sparse vector. In other words, the first sequence is obtained by superimposing the K activation sequences selected from the codebook.

S440. The terminal device sends a received signal, and the network device obtains the received signal.

It should be understood that the received signal includes the first sequence and an additive white Gaussian noise. The first sequence may be represented by using a codebook and a first sparse vector, that is, the first sequence is represented by using a product of the codebook and the first sparse vector. The received signal is shown in Formula (1).

$y_M$ represents a received signal, $F_{M \times N}$ represents a perception matrix, $F_{M \times N} s_N$ represents a first sequence, $n_M$ represents additive white Gaussian noise on M time-frequency resources, $s_N$ represents an N-dimensional 0-1 sparse vector, where a non-zero element 1 indicates a selected sequence in the perception matrix. For example, the first sparse vector corresponding to FIG. 5 is $s_N = [0000\ 0100\ 0000\ 0000\ 1000\ \ldots\ 0010]^T$.

S450. The network device performs decoding based on a compressive sensing algorithm and an activation threshold.

In a possible implementation, the network device decodes the received signal based on the compressive sensing algorithm, to obtain a recovered first sparse vector, that is, a second sparse vector $\hat{s}_N$. The second sparse vector and the first sparse vector represent a same meaning, and both are used to indicate the selected activation sequence in the codebook, but the values are different.

It should be understood that the compressive sensing algorithm may be an AMP algorithm, or may be another compressive sensing algorithm, for example, another compressive sensing algorithm such as orthogonal matching pursuits (OMP) and compressive sampling matching pursuits (CoSaMP). This is not limited in this application.

The network device sets an activation threshold $\tau$, where the activation threshold is for determining an element in the second sparse vector, and the second sparse vector also has L groups. The network device compares a maximum value of an element in each group with an activation threshold, and if the maximum value is greater than the activation threshold, the maximum value is modified to 1. That is, a group in which an element whose maximum value is 1 is located is an activation group. If the maximum value is less than or equal to the activation threshold, the maximum value is modified to 0, that is, a group in which an element whose maximum value is determined to be 0 is a non-activation group, elements in other second sparse vectors are all 0, and the modified second sparse vector represents a third sparse vector.

The network device decodes the information bit based on the location of the non-zero element in the third sparse vector and according to the predefined first mapping rule and the predefined second mapping rule. The information bit includes a first information bit and a second information bit.

In a possible implementation, the first information bit may be obtained based on the location of the group in which the non-zero element in the third sparse vector is located in the codebook and according to the first mapping rule.

For example, a group in which a non-zero element in the third sparse vector is located is an activation group, and location information of the activation group is obtained. If the first mapping rule uses a natural mapping manner, the first mapping rule indicates a mapping relationship between the location information of the activation group and the first information bit. That is, the first mapping rule indicates that the $C_L^K$ methods for selecting activation groups are numbered to form a mapping table. A mapping table corresponding to the first mapping rule during decoding is the same as a mapping table corresponding to the first mapping rule during encoding. The network device obtains, based on the location information of the activation group according to the first mapping rule, decimal numbers that are in the mapping table and that are corresponding to the K groups selected from the L groups in the codebook, and converts the decimal numbers into binary bits. The binary bits are the first information bits.

If the first mapping rule is obtained through calculation by using a greedy algorithm, numbers $i = C_{n_1}^1 + C_{n_2}^2 + \ldots + C_{n_K}^K$ of the K activation groups are obtained based on location information $\{n_1, n_2, \ldots n_K\}$ of the K activation groups, and decimal numbers are converted into binary bits, where the binary bits are the first information bits.

Meanings of the location information of the K activation groups are explained by using an example. If K is 3, only three of the L groups are activation groups. In this case, the location information of the three activation groups is represented as $\{n_1, n_2, n_3\}$, where the L groups are numbered from 1. The three activation groups are respectively in $n_{1th}$, $n_{2th}$, and $n_{3th}$ among the L groups.

In a possible implementation, the network device may obtain the second information bit based on the location of the non-zero element in the third sparse vector in the group in which the non-zero element is located and according to the second mapping rule.

When the network device decodes the improved sparse superposition code in this embodiment of this application, because the K activation vectors are less than the L activation vectors, interference when the network device determines an activation sequence becomes smaller. Therefore, even if the quantity L of groups in the codebook increases, the technical solutions in this embodiment of this application can reduce a code error rate of the network device.

Currently, in a multi-user scenario, each user performs coding and modulation based on a separate codebook by using a sparse superposition code manner, and a received signal received by the network device is shown in formula (2).

$$y = \sum_{u=1}^{U} F_u s_u + n = \underbrace{[F_1 \ldots F_U]}_{F} \begin{bmatrix} s_1 \\ \vdots \\ s_U \end{bmatrix}_s + n \quad (2)$$

y is the received signal, $$\sum_{u=1}^{U} F_u s_u$$

is the encoded sequence, n is the additive white Gaussian noise, $F_u$ is the independent codebook of different users, that is, the perception matrix, and $s_u$ is the sparse vector corresponding to the different users.

In a multi-user scenario, when the network device performs decoding, because there are a large quantity of codebooks, decoding difficulty of the network device is increased, thereby reducing decoding performance of the network device. However, the technical solutions in this embodiment of this application may be applied not only to a single-user scenario, but also to a multi-user scenario. When the technical solutions in this embodiment of this application are applied to a multi-user scenario, a plurality of users use a shared codebook, that is, $F_{M \times N} = F_1 = F_2 = \ldots = F_U$, the quantity of codebooks does not increase with the increase of the quantity of users. Therefore, using the technical solutions in embodiments of this application does not increase complexity of decoding by the network device.

Figure 6:
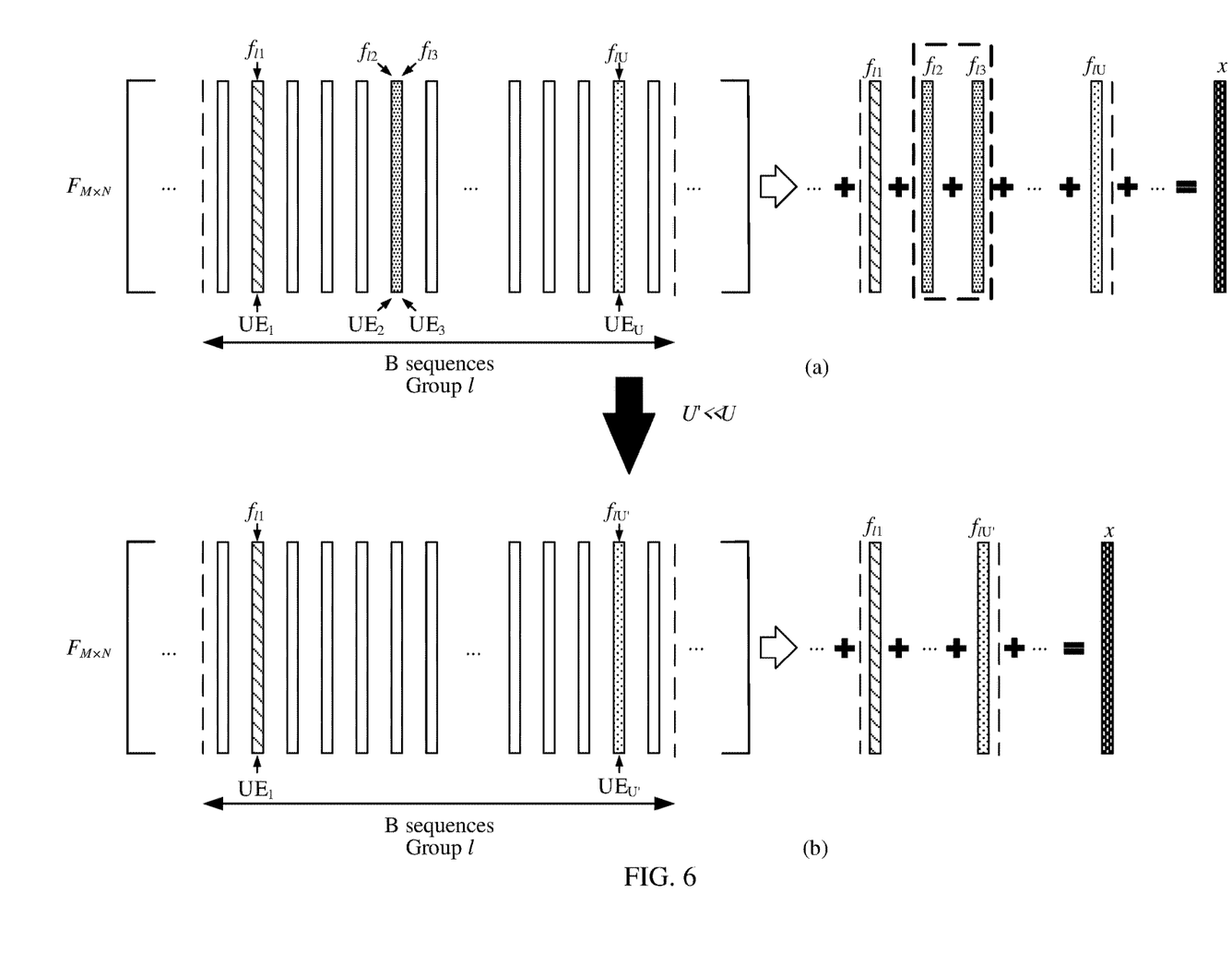
FIG. 6 is a schematic diagram of a beneficial effect of applying an encoding method to multi-user according to an embodiment of this application.

The following describes beneficial effects of the technical solutions in an embodiment of this application in a multi-user scenario with reference to FIG. 6. FIG. 6 is a schematic diagram of beneficial effects of applying an encoding method to multi-user according to an embodiment of this application.

When a shared codebook is used in a multi-user scenario, if an existing sparse superposition code manner is used, a problem of codeword collision may occur. Because the quantity B of sequences in each group does not increase infinitely with the increase of the quantity of users, when the plurality of users use the shared codebook, each user needs to select activation sequence in each group thereof. Therefore, a same activation sequence may be selected in a same group. As shown in (a) in FIG. 6, a user 2 and a user 3 each select a sixth activation sequence from the $l^{th}$ group based on bit information of the user 2 and the user 3 respectively. In this case, codeword collision occurs, and the codeword collision causes decoding performance of the network device to deteriorate.

When the network device decodes the improved sparse superposition code in this embodiment of this application, due to sparseness of user group activation, not all users select a same activation group. In other words, a quantity of users who need to select an activation vector from a same group is far less than a total quantity of users. Therefore, a possibility that different users select a same activation sequence from a same activation group is reduced, as shown in (b) in FIG. 6. Therefore, a probability of codeword collision is reduced, and decoding performance of the network device for a plurality of users is further improved.

The foregoing describes in detail the encoding method and the decoding method embodiments of this application with reference to FIG. 1 to FIG. 6. The following describes apparatus embodiments of this application with reference to FIG. 7 to FIG. 10. For details that are not described in detail, refer to the foregoing method embodiments.

Figure 7:
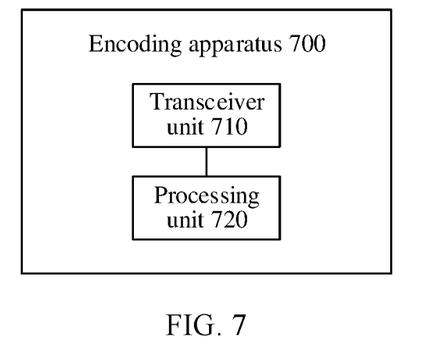
FIG. 7 is a schematic diagram of an encoding apparatus according to an embodiment of this application.

FIG. 7 is a schematic diagram of an encoding apparatus according to an embodiment of this application. As shown in FIG. 7, an encoding apparatus 700 includes a transceiver unit 710 and a processing unit 720.

In a possible design, the encoding apparatus corresponds to the terminal device in the foregoing method embodiments, for example, may be a terminal device or a chip configured in the terminal device.

Specifically, the transceiver unit 710 is configured to obtain an information bit, where the information bit includes a first information bit and a second information bit; and the processing unit 720 is configured to: select, based on the first information bit, K groups from a codebook having L groups as activation groups, where both L and K are positive integers and K is less than L; select, based on the second information bit, a sequence from each of the activation groups as an activation sequence; and obtain a first sequence, where the first sequence is obtained by superimposing the K activation sequences.

Optionally, in an embodiment, the processing unit 720 is configured to obtain the K activation groups based on the first information bit according to a first mapping rule, where the first mapping rule is for determining locations of the K activation groups; and obtain the K activation sequences based on the second information bit according to a second mapping rule, where the second mapping rule is for determining a location of an activation sequence of each of the K activation groups.

Optionally, in an embodiment, the transceiver unit 710 is further configured to obtain an encoding parameter, where the encoding parameter includes at least one of the following: a quantity L of codebook groups, a quantity K of activation groups, a quantity B of sequences in each group, a sequence length M, and a codebook type.

Optionally, in an embodiment, the transceiver unit 710 is further configured to send a received signal, where the received signal is obtained based on the first sequence and an additive white Gaussian noise, the first sequence is represented by using the codebook and a first sparse vector, and the first sparse vector is obtained based on the first information bit and the second information bit.

Optionally, in an embodiment, the first sequence is represented by using the codebook and a first sparse vector includes that the first sequence is represented by using a product of the codebook and the first sparse vector.

Figure 8:
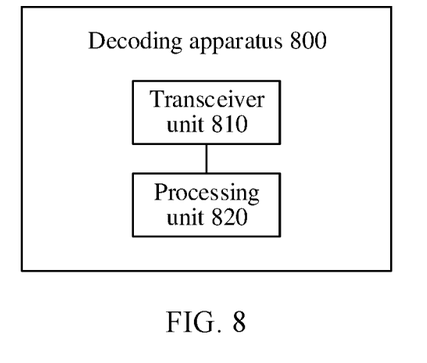
FIG. 8 is a schematic diagram of a decoding apparatus according to an embodiment of this application.

FIG. 8 is a schematic diagram of a decoding apparatus according to an embodiment of this application. As shown in FIG. 8, the decoding apparatus 800 includes a transceiver unit 810 and a processing unit 820.

In a possible design, the decoding apparatus corresponds to the network device in the foregoing method embodiments, for example, may be a network device or a chip configured in the network device.

Specifically, the transceiver unit 810 is configured to obtain a received signal, where the received signal includes a first sequence and an additive white Gaussian noise; the processing unit 820 is configured to determine a second sparse vector based on an activation threshold, to obtain a third sparse vector, where the second sparse vector is obtained by decoding the received signal based on a compressive sensing algorithm; and the processing unit 820 is configured to obtain an information bit based on the third sparse vector, where the information bit includes a first information bit and a second information bit.

Optionally, in an embodiment, if a maximum value in each group in the second sparse vector is greater than the activation threshold, a value of an element that is in the third sparse vector and that corresponds to the maximum value is 1; or if a maximum value of an element in each group in the second sparse vector is less than or equal to the activation threshold, a value of an element that is in the third sparse vector and that corresponds to the maximum value of the element is 0; and a value of an element that is in the third sparse vector and that corresponds to another element in each group in the second sparse vector is 0.

Optionally, in an embodiment, the processing unit 820 decodes the third sparse vector according to a first mapping rule and a second mapping rule, to obtain the information bit, where the first information bit is for determining K activation groups selected from a codebook having L groups, and the second information bit is for determining an activation sequence in each of the activation groups, where both L and K are positive integers, and K is less than L.

Optionally, in an embodiment, the transceiver unit 810 is further configured to obtain a decoding parameter, where the decoding parameter further includes at least one of the following parameters: a quantity L of codebook groups, a quantity B of sequences in each group, a sequence length M, and a codebook type.

Figure 9:
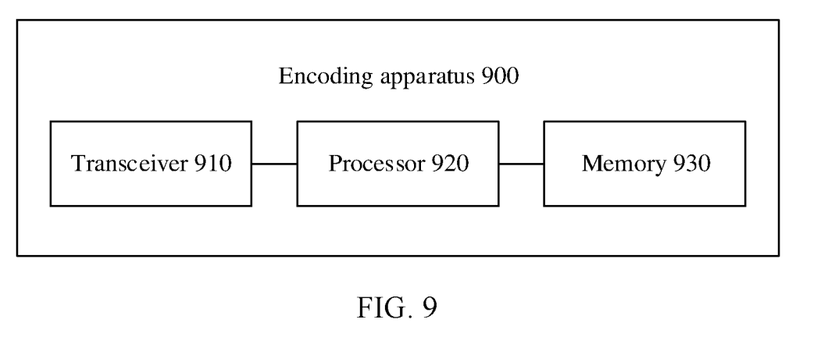
FIG. 9 is a schematic diagram of another encoding apparatus according to an embodiment of this application.

In an optional embodiment, FIG. 9 is a schematic diagram of another encoding apparatus according to an embodiment of this application. An encoding apparatus 900 includes a transceiver 910 and a processor 920. The transceiver 910 corresponds to the transceiver unit 710, and the processor 920 corresponds to the processing unit 720. Optionally, the encoding apparatus 900 may further include a memory 930, which is specifically shown in FIG. 9.

Specifically, the processor 920 is connected to the memory 930. The processor 920, the transceiver 910, and the memory 930 communicate with each other by using an internal connection channel, to transmit a control signal and/or a data signal.

The transceiver 910 may be an antenna or a control circuit having a transceiver function, and the transceiver may include a receiver configured to receive data and a transmitter configured to send data. The memory 930 may be configured to store instructions. The processor 920 is configured to execute the instructions stored in the memory 930, and control the transceiver 910 to receive and send information or a signal. When executing the instructions in the memory 930, the processor 920 can complete processes related to the encoding apparatus in the foregoing method embodiments. To avoid repetition, no details are provided.

Figure 10:
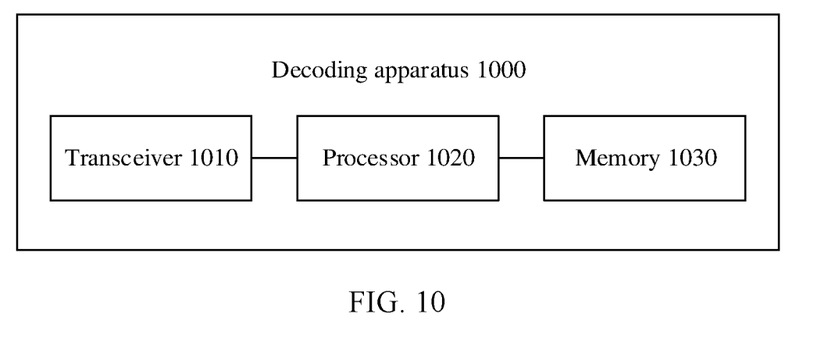
FIG. 10 is a schematic diagram of another decoding apparatus according to an embodiment of this application.

In an optional embodiment, FIG. 10 is a schematic diagram of another encoding apparatus according to an embodiment of this application. An encoding apparatus 1000 includes a transceiver 1010 and a processor 1020. The transceiver 1010 corresponds to the transceiver unit 810, and the processor 1020 corresponds to the processing unit 820. Optionally, the encoding apparatus 1000 may further include a memory 1030, which is specifically shown in FIG. 10.

Specifically, the processor 1020 is connected to the memory 1030. The processor 1020, the transceiver 1010, and the memory 1030 communicate with each other by using an internal connection channel, to transmit a control signal and/or a data signal.

The transceiver 1010 may be an antenna or a control circuit having a transceiver function, and the transceiver may include a receiver configured to receive data and a transmitter configured to send data. The memory 1030 may be configured to store instructions. The processor 1020 is configured to execute the instructions stored in the memory 1030, and control the transceiver 1010 to receive and send information or a signal. When executing the instructions in the memory 1030, the processor 1020 can complete processes related to the encoding apparatus in the foregoing method embodiments. To avoid repetition, no details are provided.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. It may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through illustrative but not limited description, many forms of RAMs may be used, for example, a static random access memory (static RAM, SRAM), a dynamic RAM (DRAM), a synchronous DRAM (SDRAM), a double data rate SDRAM (DDR SDRAM), an enhanced synchronous dynamic random access memory (enhanced SDRAM, ESDRAM), a synchronous link DRAM (synchlink DRAM, SLDRAM), and a direct rambus RAM (DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method in any one of embodiments shown in FIG. 3 and FIG. 4.

According to the methods provided in embodiments of this application, this application further provides a computer-readable storage medium. The computer-readable medium stores program code. When the program code is run on a computer, the computer is enabled to perform the method in any one of embodiments shown in FIG. 3 and FIG. 4.

According to the methods provided in embodiments of this application, this application further provides a system. The system includes the foregoing one or more terminal devices and the foregoing one or more network devices.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedures, or functions based on embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

The network side device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data groups (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An encoding method performed by a terminal device, comprising:
    obtaining a first information bit and a second information bit;
    selecting, based on the first information bit, K activation groups from a codebook having L groups, wherein L and K are positive integers, and K is less than L;
    selecting, based on the second information bit, an activation sequence from each of the K activation groups to obtain K activation sequences; and
    obtaining a first sequence by superimposing the K activation sequences selected from the K activation groups.

2. The method according to claim 1, wherein the step of selecting the K activation groups comprises obtaining the K activation groups based on the first information bit according to a first mapping rule, and wherein the step of selecting the activation sequence from each of the K activation groups comprises obtaining the K activation sequences based on the second information bit according to a second mapping rule for determining a location of the activation sequence of each of the K activation groups.

3. The method according to claim 1, further comprising:
    obtaining an encoding parameter comprising a quantity L of codebook groups, a quantity K of activation groups, a quantity B of sequences in each group, a sequence length M, or a codebook type, wherein B and M are positive integers.

4. The method according to claim 1, further comprising:
    generating a received signal based on the first sequence and an additive white Gaussian noise, wherein the first sequence is represented by using the codebook and a first sparse vector, and the first sparse vector is obtained based on the first information bit and the second information bit; and
    sending the received signal to a network device.

5. The method according to claim 4, wherein the first sequence is represented by using a product of the codebook and the first sparse vector.

6. A decoding method performed by a network device, comprising:
    obtaining a received signal from a terminal device, wherein the received signal comprises a first sequence and an additive white Gaussian noise;
    decoding the received signal based on a compressive sensing algorithm to obtain a second sparse vector;
    determining, based on the second sparse vector and an activation threshold, a third sparse vector; and
    obtaining a first information bit and a second information bit based on the third sparse vector.

7. The method according to claim 6, wherein the step of determining the third sparse vector comprises:
    when a maximum value in each group in the second sparse vector is greater than the activation threshold, setting a value of an element that is in the third sparse vector and that corresponds to the maximum value to 1; or when a maximum value of an element in each group in the second sparse vector is less than or equal to the activation threshold, setting a value of an element that is in the third sparse vector and that corresponds to the maximum value of the element to 0; and setting a value of an element that is in the third sparse vector and that corresponds to another element in each group in the second sparse vector to 0.

8. The method according to claim 6, wherein the step of obtaining the first and second information bits based on the third sparse vector comprises:

decoding the third sparse vector according to a first mapping rule and a second mapping rule, to obtain the first information bit and the second information bit.

9. The method according to claim 8, wherein the first mapping rule is for determining the first information bit corresponding to locations of K activation groups, and the second mapping rule is for determining the second information bit corresponding to a location of an activation sequence of each of the K activation groups, and wherein K is a positive integer.

10. The method according to claim 6, further comprising:
obtaining a decoding parameter comprising a quantity L of codebook groups, a quantity B of sequences in each group, a sequence length M, or a codebook type, wherein L, B and M are positive integers.

11. A terminal device comprising:
a memory storing executable instructions; and
one or more processors configured to execute the executable instructions to perform operations of:
obtaining a first information bit and a second information bit;
selecting, based on the first information bit, K activation groups from a codebook having L groups, wherein L and K are positive integers, and K is less than L;
selecting, based on the second information bit, an activation sequence from each of the K activation groups to obtain K activation sequences; and
obtaining a first sequence by superimposing the K activation sequences selected from the K activation groups.

12. The terminal device according to claim 11, wherein the operation of selecting the K activation groups comprises obtaining the K activation groups based on the first information bit according to a first mapping rule, and wherein the operation of selecting the activation sequence from each of the K activation groups comprises obtaining the K activation sequences based on the second information bit according to a second mapping rule for determining a location of the activation sequence of each of the K activation groups.

13. The terminal device according to claim 11, wherein the one or more processors are further configured to perform an operation of:
obtaining an encoding parameter comprising a quantity L of codebook groups, a quantity K of activation groups, a quantity B of sequences in each group, a sequence length M, or a codebook type, wherein B and M are positive integers.

14. The terminal device according to claim 11, wherein the one or more processors are further configured to perform operations of:

generating a received signal based on the first sequence and an additive white Gaussian noise, wherein the first sequence is represented by using the codebook and a first sparse vector, and the first sparse vector is obtained based on the first information bit and the second information bit; and sending the received signal to a network device.

15. The terminal device according to claim 14, wherein the first sequence is represented by using a product of the codebook and the first sparse vector.

16. A network device comprising:
a memory storing executable instructions; and
one or more processors configured to executable the executable instructions to perform operations of:
obtaining a received signal from a terminal device, wherein the received signal comprises a first sequence and an additive white Gaussian noise;
decoding the received signal based on a compressive sensing algorithm to obtain a second sparse vector;
determining, based on the second sparse vector and an activation threshold, a third sparse vector; and
obtaining a first information bit and a second information bit based on the third sparse vector.

17. The network device according to claim 16, wherein the operation of determining the third sparse vector comprises:

when a maximum value in each group in the second sparse vector is greater than the activation threshold, setting a value of an element that is in the third sparse vector and that corresponds to the maximum value to 1; or when a maximum value of an element in each group in the second sparse vector is less than or equal to the activation threshold, setting a value of an element that is in the third sparse vector and that corresponds to the maximum value of the element to 0; and setting a value of an element that is in the third sparse vector and that corresponds to another element in each group in the second sparse vector to 0.

18. The network device according to claim 16, wherein the operation of obtaining the first and second information bits based on the third sparse vector comprises:

decoding the third sparse vector according to a first mapping rule and a second mapping rule, to obtain the first and second information bits.

19. The network device according to claim 18, wherein the first mapping rule is for determining the first information bit corresponding to locations of K activation groups, and the second mapping rule is for determining the second information bit corresponding to a location of an activation sequence of each of the K activation groups, and wherein K is a positive integer.

20. The network device according to claim 16, wherein the one or more processors are further configured to perform an operation of:
obtaining a decoding parameter comprising a quantity L of codebook groups, a quantity B of sequences in each group, a sequence length M, or a codebook type, wherein L, B and M are positive integers.

* * * * *